United States Patent

[19]

Liu

[11] Patent Number: 6,022,295

[45] Date of Patent: Feb. 8, 2000

[54] TOUCH POINT IDENTIFICATION FOR VEHICLE MASTER CLUTCH

[75] Inventor: Chia-Hsiang Liu, Northville, Mich.

[73] Assignee: Eaton Corporation, Cleveland, Ohio

[21] Appl. No.: 09/189,995

[22] Filed: Nov. 12, 1998

[51] Int. Cl.$^7$ ................................. B60K 41/02
[52] U.S. Cl. ............................ 477/180; 477/78; 74/335
[58] Field of Search ........................... 477/78, 79, 77, 477/180, 181; 74/335

[56] References Cited

U.S. PATENT DOCUMENTS

| | | | |
|---|---|---|---|
| 4,081,065 | 3/1978 | Smyth et al. | 192/0.076 |
| 4,361,060 | 11/1982 | Smyth | 74/866 |
| 4,595,986 | 6/1986 | Daubenspeck | 364/424.1 |
| 4,646,891 | 3/1987 | Braun | 192/0.032 |
| 4,700,823 | 10/1987 | Winckler | 192/107 |
| 4,860,861 | 8/1989 | Gooch et al. | 192/3.26 |
| 4,899,858 | 2/1990 | Cote et al. | 192/111 A X |
| 5,275,267 | 1/1994 | Slicker | 192/0.033 |
| 5,293,316 | 3/1994 | Slicker | 364/424.1 |
| 5,314,050 | 5/1994 | Slicker et al. | 477/171 |
| 5,337,868 | 8/1994 | Liu et al. | 477/74 |
| 5,337,874 | 8/1994 | Oltean et al. | 192/111 |
| 5,383,823 | 1/1995 | Ward et al. | 447/86 |
| 5,393,274 | 2/1995 | Smedley | 477/74 |
| 5,404,301 | 4/1995 | Slicker | 364/424.1 |
| 5,411,124 | 5/1995 | Olson | 192/103 |
| 5,441,137 | 8/1995 | Organek et al. | 192/35 |
| 5,485,903 | 1/1996 | Organek et al. | 192/35 |
| 5,509,867 | 4/1996 | Genise | 477/120 |
| 5,624,350 | 4/1997 | Bates | 477/78 |
| 5,630,773 | 5/1997 | Slicker et al. | 477/176 |
| 5,634,867 | 6/1997 | Mack | 477/180 X |
| 5,738,609 | 4/1998 | Jones et al. | 477/175 |

*Primary Examiner*—Khoi Q. Ta
*Attorney, Agent, or Firm*—Howard D. Gordon

[57] ABSTRACT

A control for a drive line (10) including an automated clutch (14) utilizing an electronic data link (DL) to identify the value of a clutch control parameter (PWM) corresponding to the clutch touch point.

15 Claims, 6 Drawing Sheets

TOUCH POINT IDENTIFICATION FOR VEHICLE MASTER CLUTCH

RELATED APPLICATIONS

This application is related to the following applications, all assigned to EATON CORPORATION, assignee of this application, and all not filed the same date, Nov. 12, 1998, as this application:

Ser. No. 09/197544 [98-rTRN-399] entitled VEHICLE LAUNCH AUTOMATED MASTER CLUTCH CONTROL filed Nov. 13, 1998.

Ser. No. 09/197544 [98-rTRN-400] entitled IDLE DRIVE TORQUE CONTROL FOR AUTOMATED VEHICLE MASTER CLUTCH filed Nov. 18, 1998.

BACKGROUND OF THE INVENTION

1. Field of the Invention

The present invention relates to controls for vehicular master clutches, preferably wet friction clutches, utilized in partially or fully automated mechanical transmission systems. In particular, the present invention relates to a touch point identification method/system utilizing an electronic data link.

2. Description of the Prior Art

Partially and fully automated vehicular mechanical transmission systems utilizing friction master clutches are known in the prior art, as may be seen by reference to U.S. Pat. Nos. 4,361,060; 4,595,986; 4,850,236; 4,648,290; 5,389,053; 5,487,004; 5,487,005 and 5,509,867, the disclosures of which are incorporated herein by reference.

Controls for automated friction master clutches, usually dry friction clutches, utilized in vehicular automated transmission systems are known, as may be seen by reference to U.S. Pats. Nos. 4,081,065; 4,646,891; 4,860,861; 5,275,267; 5,293,316; 5,314,050; 5,337,868; 5,337,874; 5,383,823; 5,393,274; 5,411,124; 5,404,301; 5,630,773; 5,624,350 and 5,738,609, the disclosures of which are incorporated herein by reference.

SUMMARY OF THE INVENTION

According to the present invention, a control for an automated master friction clutch, such as a wet friction clutch, is provided which utilizes the information available on industry standard vehicular data links, such as data links conforming to the SAE J1922, SAE J1939 and/or ISO 11898 protocols, to provide improved clutch control and clutch functional features as compared to the prior art. In particular, a clutch touch point, also called the point of incipient engagement, is determined by sensing and/or controlling engine speed and flywheel torque utilizing an electronically controlled engine connected to an industry standard data link (see U.S. Pat. No. 5,509,867, the disclosure of which is incorporated herein by reference).

Accordingly, it is an object of the present invention to provide an improved clutch control method/system utilizing the control and information available on an electronic data link to determine the vaue of a clutch control parameter corresponding to the clutch touch point.

This and other objects and advantages of the present invention will become apparent from a reading of the following description of the preferred embodiment taken in connection with the attached drawings.

DESCRIPTION OF THE PREFERRED EMBODIMENT

Figure 1:
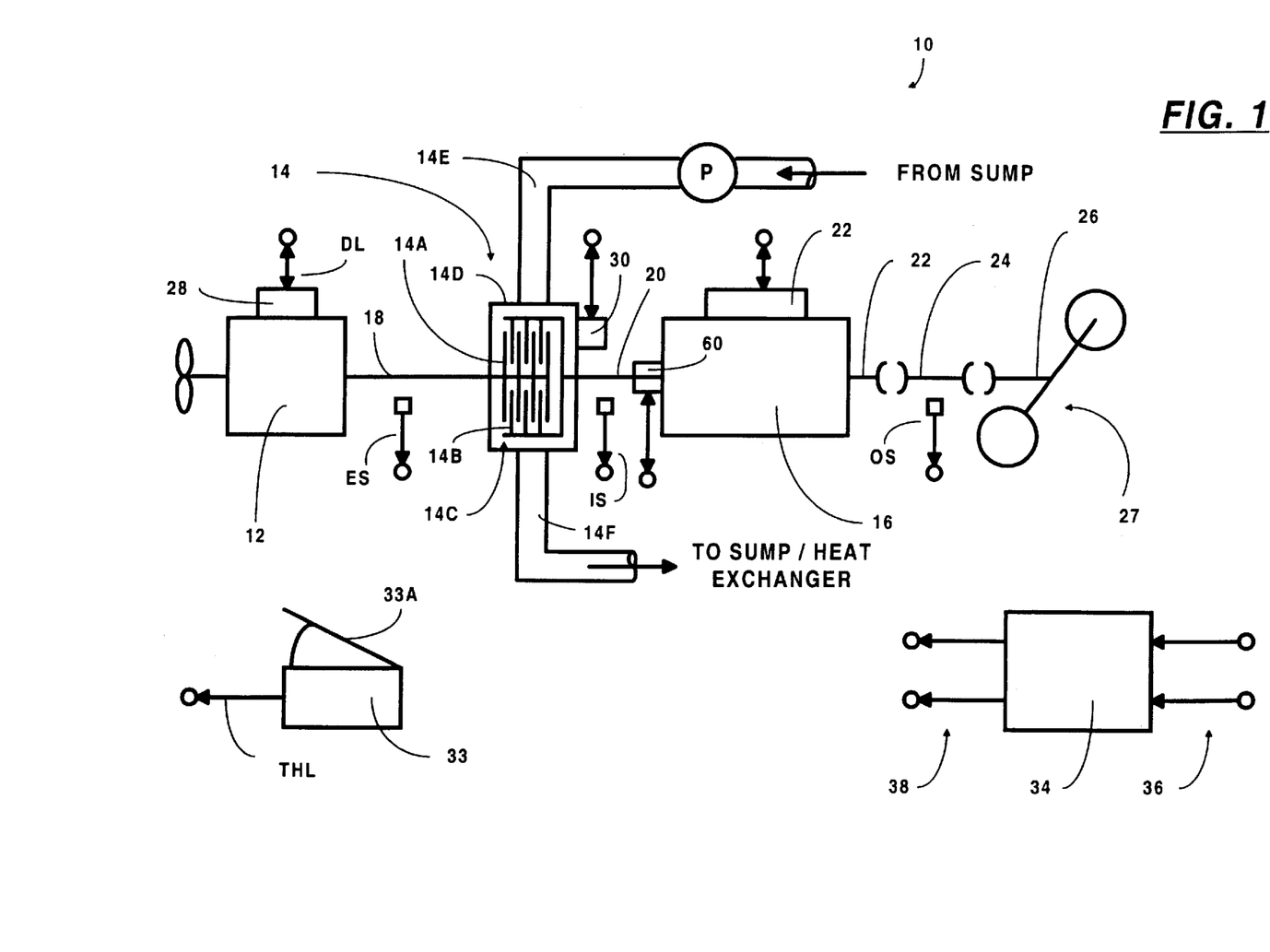
FIG. 1 is a schematic illustration of a vehicular automated mechanical transmission system advantageously utilizing the touch point identification control of the present invention.

A vehicular automated mechanical transmission system 10 advantageously utilizing the touch point identification control of the present invention is schematically illustrated in FIG. 1.

System 10 includes a fuel-controlled engine 12, a wet master friction clutch 14 and a multiple-speed mechanical transmission 16. Engine 12 is typically a diesel or gasoline engine and has an output member or crank shaft 18 which drives friction discs 14A of clutch 14, which are interdigitated with friction discs 14B, rotationally fixed to input shaft 20 of transmission 16.

Transmission 16 may be of the simple or compound type, as illustrated in U.S. Pat. No. 5,370,561, the disclosure of which is incorporated herein by reference. Transmission 16 has an output shaft 22, which drives a drive shaft 24 connected to the input 26 of a vehicle drive axle mechanism 27.

An engine controller 28, which is preferably electronically and microprocessor-controlled, is provided for controlling fueling of the engine and for providing output information to an electronic data link DL, preferably conforming to the industry standard SAE J1939 or a comparable protocol. System 10 also includes a clutch actuator 30 for controlling operation of clutch 14 and a transmission actuator 32 for controlling operation of transmission 16. A sensor 33 is provided for sensing throttle position and providing a signal THL indicative thereof.

Electronic engines controlled by an SAE J1939 or similar data link typically have four modes of operation, (i) fuel according to throttle position, (ii) fuel according to requested engine speed, (iii) fuel according to requested gross engine torque, and (iv) fuel according to requested engine speed and gross engine torque.

A microprocessor-based control unit 34 is provided for receiving input signals 36 and processing same according to control logic to generate command output signals 38 to the system actuators. The ECU may be separate or integral with the engine controller. The various controllers, sensors and/or actuators may communicate over a data link conforming to an industry standard protocol, such as SAE J1939 or the like.

Suitable sensors, such as sensors for sensing engine speed ES, input shaft speed IS and/or output shaft speed OS, and actuators are known to those of ordinary skill in the art and examples thereof, not intended to be limiting, may be seen by reference to U.S. Pat. Nos. 4,361,060; 4,873,881; 4,974, 468; 5,135,218; 5,279,172; 5,305,240; 5,323,669; 5,408,898; 5,441,137; 5,445,126; 5,448,483 and 5,481,170.

Clutch 14 is defined as a "wet clutch," as the friction members thereof, 14A and 14B, are exposed to liquid, such as a synthetic such as Dextron III or the like, for heat transfer and/or lubrication purposes. In the illustrated embodiment, the clutch pack 14C is contained within a housing 14D, which is connected to source conduit 14E and an exhaust conduit 14F. While a forced coolant system is illustrated, the present invention also is applicable to wet clutches wherein the friction members are in a relatively static sump or the like. While the illustrated preferred embodiment utilizes a multidisc wet clutch 14, the present invention also is applicable to single-disc wet clutches and/or dry clutches.

As is known (see aforementioned U.S. Pat. No. 5,509,867), a data link conforming to the SAE J1939 protocol or a comparable protocol, transmits information by which engine output torque (also called "flywheel torque") may be read or determined. These data links also allow a command to the engine to adjust fueling such that a particular engine speed and/or a particular engine torque is achieved. By utilizing this information and engine control capability, the master clutch 14 may be controlled to provide enhanced system performance.

Figure 2:
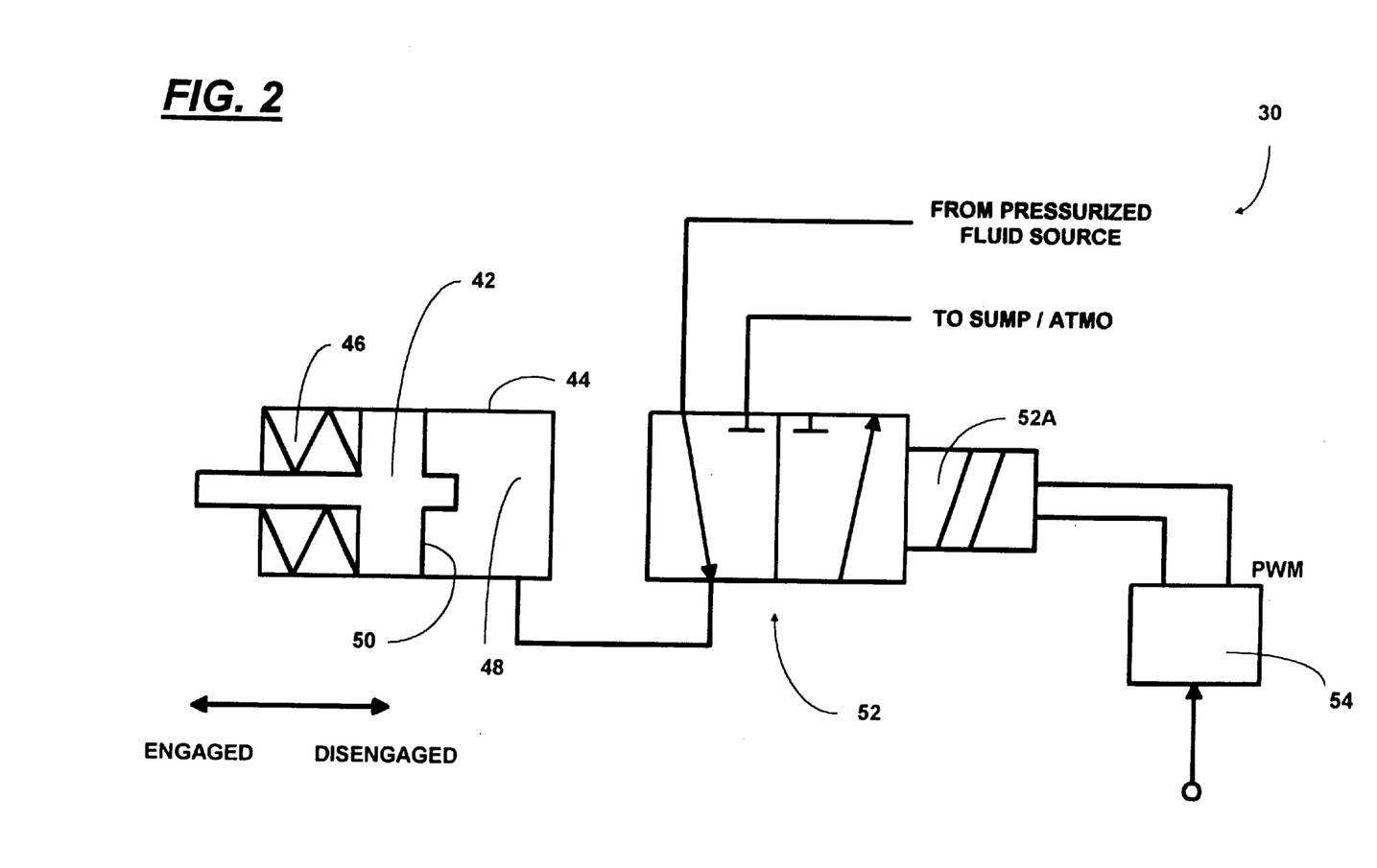
FIG. 2 is a schematic illustration of a pressurized fluid-actuated control mechanism for controlling the engaged condition of a vehicular master clutch.

A fluid pressure-operated clutch actuator assembly 30 is schematically illustrated in FIG. 2. A clutch operator piston 42 is received in a cylinder 44 and is biased in the disengaging direction by springs 46. Pressurized fluid, such as a hydraulic fluid or pressurized air, introduced into chamber 48 will act on piston face 50 to move the piston 42 in the engaged direction against the bias of the springs. A two-position, three-way, solenoid-controlled valve 52 is provided to selectively pressurize and exhaust chamber 48. A valve controller 54 responding to control signals from system controller 34 controls energizing of the solenoid 52A of valve 52, preferably by pulse width modulation (PWM).

Although a pressurized fluid-type actuator assembly 30 is illustrated, the present invention also is applicable to clutch controls using other types of clutch actuators, such as ball ramp actuators or the like (see U.S. Pat. Nos. 5,441,137 and 5,485,903, the disclosures of which are incorporated herein by reference).

The friction material of clutch discs 14A and 14B may be of standard material or may be of pyrolytic carbon, as disclosed in U.S. Pat. No. 4,700,823 or the like.

Figure 3:
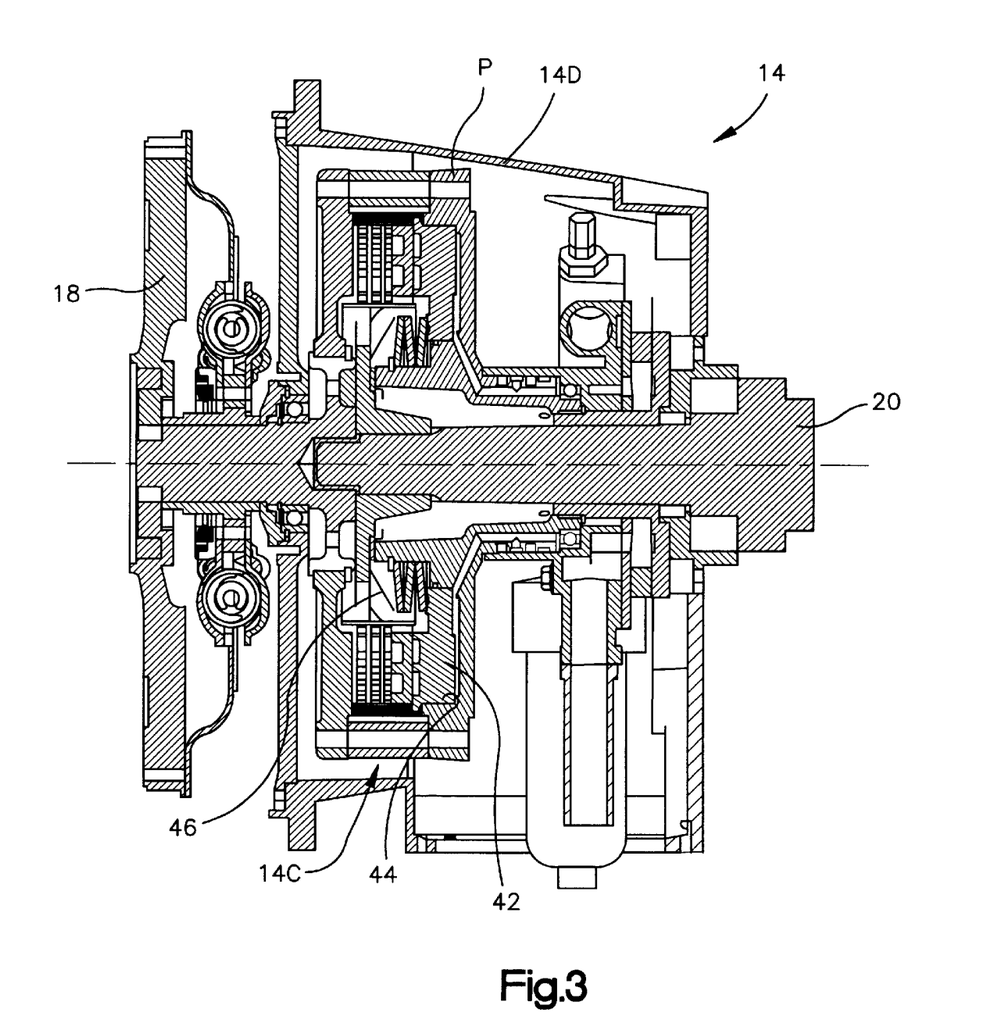
FIG. 3 is a partial sectional view of a vehicular wet master friction clutch of the type utilized in the system of FIG. 1.

The structure of a typical wet master friction clutch 14 may be seen by reference to FIG. 3. Briefly, the engine output 18, shown as a dampened flywheel, is connected to the transmission input shaft 20 by the engageable and disengageable friction disc pack 14C. The clutch is contained within a housing 14D, which will hold the lubricating and cooling fluid, such as a synthetic Dextron III or the like. Annular piston 42 is slidably and sealingly contained in a cylinder 44 and is biased in the disengaged direction by springs 46.

System 10 also may include an inertia brake, also known as an input shaft brake or upshift brake 60, for decelerating or stopping the input shaft 20 for more rapid upshifting. Inertia brakes are known, as may be seen by reference to U.S. Pat. Nos. 5,086,659 and 5,713,445.

Clutch controls including techniques for identifying the clutch touch point (also known as the point of incipient engagement) are known in the prior art, as may be seen by reference to aforementioned U.S. Pat. Nos. 4,646,891; 5,337,868; 5,337,874; 5,393,274 and 5,411,124.

According to the present invention, a method for identifying a control parameter (such as the value of a pulse width-modulated signal to a control valve) corresponding to the clutch touch point, using an electronic data link, is provided.

Figure 4A:
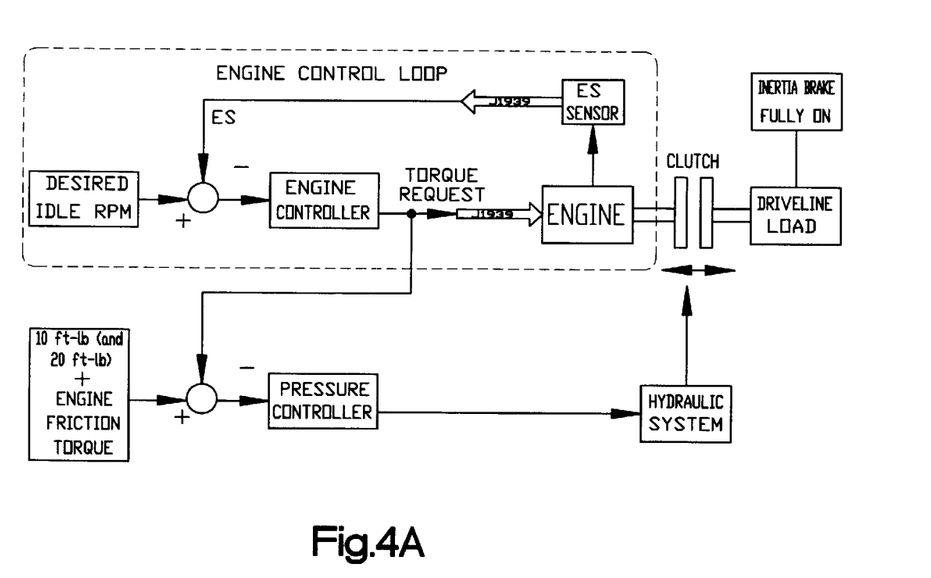
FIG. 4A is a schematic illustration of the touch point identification control system, which includes both hardware and software (shown in shadowed blocks).

FIG. 4A depicts the entire touch point identification control system, which comprises both hardware and software (shadowed blocks). The function of the engine control loop is to maintain (or control) the engine speed (ES) to a desired speed. The inertia brake 60 is the device designated to slow down or stop the rotation of the input shaft 20 of the transmission. To engage the clutch 14, the pressure controller will send a PWM command to the solenoid-actuated hydraulic system, which in turn pressurizes the clutch piston 42 to engage the clutch. Within a certain range of values, the engaged clutch torque capacity is proportional or substantially proportional to the PWM command.

As is well known, engine output or flywheel torque ($T_{FW}$) is equal to gross engine torque ($T_{EG}$) minus the sum of engine torque losses ($T_L$), such as engine friction torque, accessory torque, etc. The value of the sum of engine torque losses, at idle speed, may be determined by determining the value of engine gross torque when the clutch is fully disengaged (therefore, flywheel torque equals zero) and engine speed is stabilized at idle speed ($T_{EG}$=TL if $T_{FW}$=0). With a known value of torque losses ($T_L$) at idle speed, the value of output torque, at stabilized idle speed, will equal the value of gross engine torque minus the known value of torque losses ($T_{FW}=T_{EG}-T_L$). Accordingly, a specific engine output torque ($T_{FW}$), at a given engine speed, may be commanded by commanding a gross engine torque exceeding known torque losses by the desired output torque.

Figure 4B:
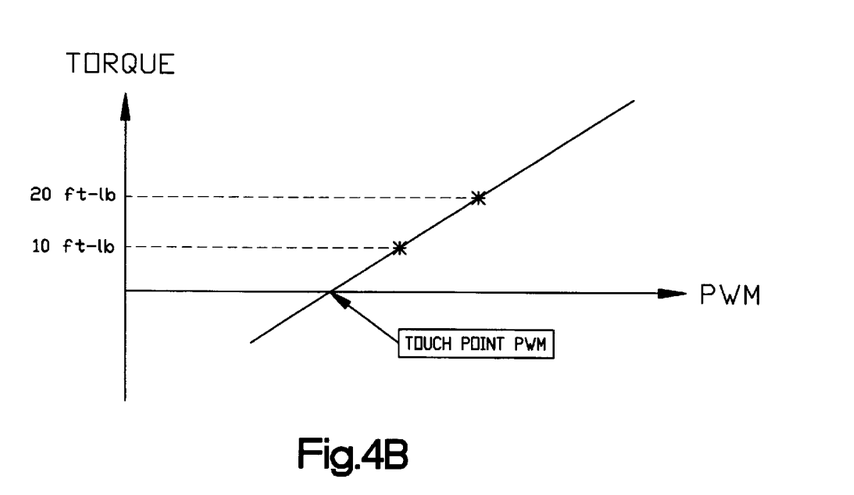
FIG. 4B is a graph illustrating a linear relationship between clutch torque transfer capacity and clutch control parameter (PWM) values.

To calibrate the system for the process of touch point identification, the engine controller will first maintain engine speed at a desired idle RPM (about 850 to 900 RPM) with clutch 14 fully disengaged by sending the appropriate engine torque request to the engine via the SAE J1939 communication link DL. When the engine control loop achieves its balance, the amount of torque request will be equal to that of engine torque losses (at desired idle RPM). Then the system will turn on the inertia brake 60 to lock the input shaft and, thus, ground the driven side 14B of the clutch. The system will then request an engine torque equal to engine torque losses plus 10 pound-feet and then try to engage the clutch gradually to the level of 10 pound-feet (i.e., when the engine stabilizes at idle speed). To do this, the system uses the value of torque request and engine speed as the feedback references. As the clutch is being engaged gradually, the load to the engine increases and, hence, slows down engine speed. As the torque request is at the value of 10 pound-feet above engine torque losses, the engaged clutch torque will be equal to 10 pound-feet when engine speed stabilizes at idle speed. The system will record the PWM level that engages 10 pound-feet clutch torque and then repeat the process to engage the clutch to another level, say 20 pound-feet. The touch point of the clutch can then be obtained simply by extrapolating the two clutch engagement values (FIG. 4B). This is possible because the torque capacity of clutch 14, especially within relatively small increments (0 to 40 pound-feet) is substantially linearly related to the PWM control signal applied to the solenoid 52A.

While the gross engine torque being generated by the engine is available on the data link, if a preferred embodiment, a more responsive control may be obtained by assuming that gross engine torque is equal to requested gross engine torque.

Figure 5:
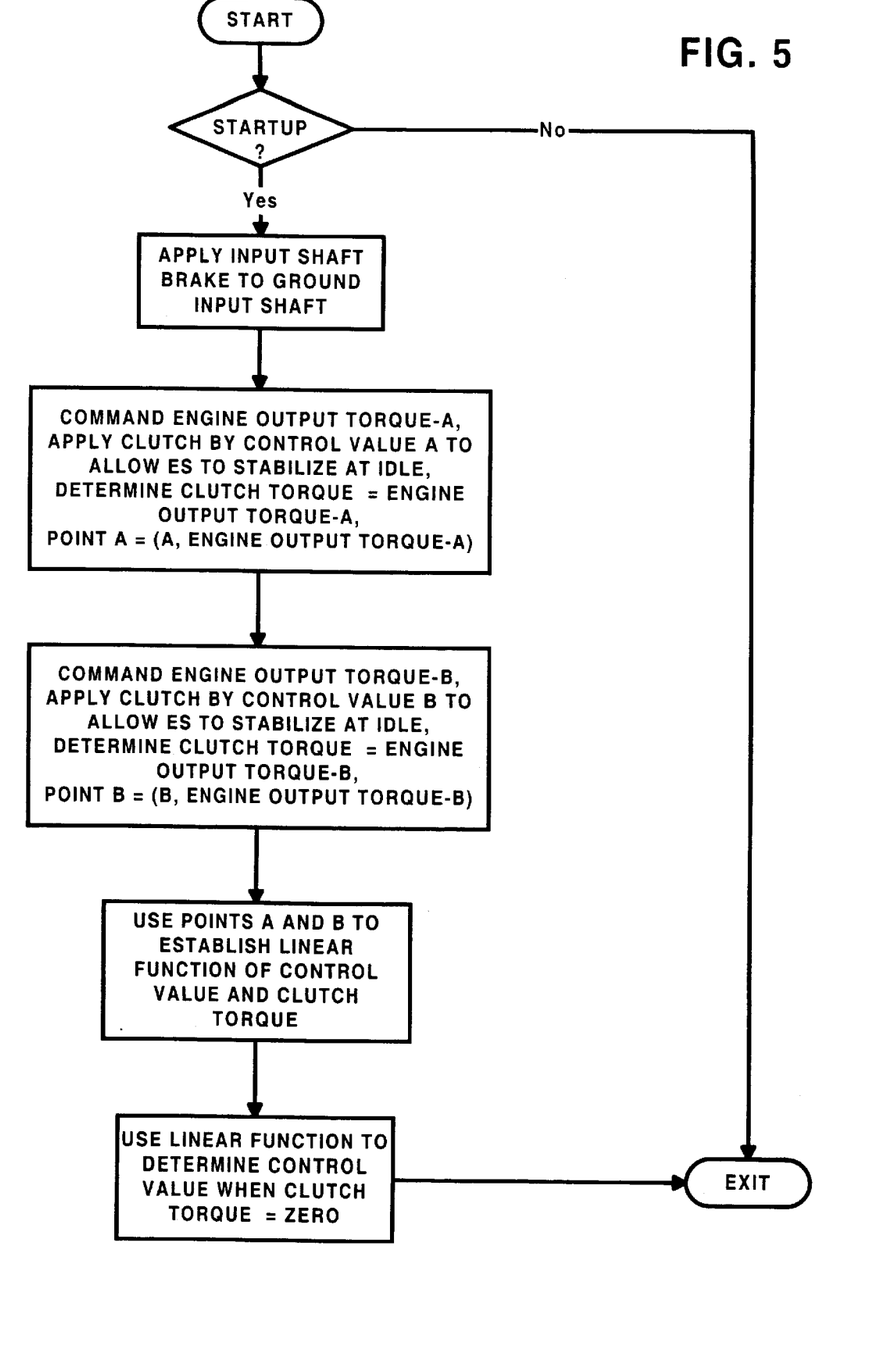
FIG. 5 is a schematic illustration, in flow chart format, of the touch point identification control logic of the present invention.
Figure 6:
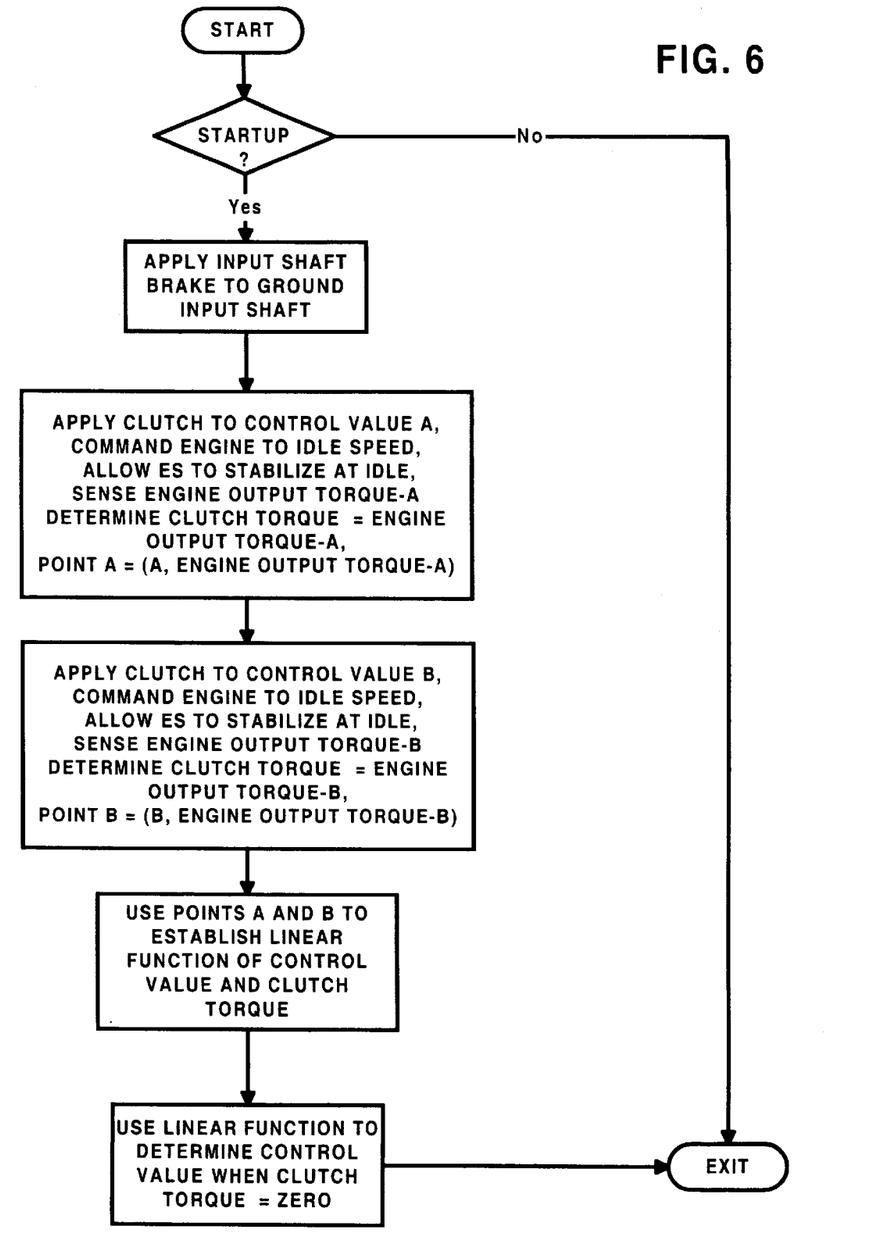
FIG. 6 is a schematic illustration, in flow chart format, of an alternate touch point identification control logic of the present invention.

FIG. 5 is a flow chart illustrating the touch point identification control logic of the present invention. As an alternative procedure, see FIG. 6, the clutch may be applied to first and second values of the control parameter, the engine output torque increased until engine speed stabilizes at idle, and then clutch torque capacity set equal to engine output torque at idle.

Accordingly, it may be seen that a new and improved touch point identification control system/method is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for determining the value of a clutch control parameter signal corresponding to an incipient engagement position of a vehicular master clutch in a vehicular drive line system including an electronically controlled internal combustion engine having an output member, a multiple-speed, change-gear transmission having an input shaft drivingly coupled to said output member by said master friction clutch, a clutch operator responding to said clutch control parameter signal to provide a selected torque transfer capacity from said output member to said input shaft, an engine controller for controlling fueling of said engine, said controller effective to fuel said engine to cause said engine to rotate at a selected engine speed and to develop a selected torque and to provide signals indicative of engine speed and developed torque, an input shaft braking device effective to retard rotation of said input shaft, a system controller for receiving input signals including signals indicative of (i) requested or sensed engine torque at said output member and (ii) engine speed, and for processing same according to logic rules to issue command output signals to system actuators including (i) said engine controller, (ii) said clutch operator and (iii) said input shaft braking device, said method characterized by:

(a) (i) applying said input shaft braking device to prevent rotation of said input shaft, (ii) causing said engine to develop a first torque at said output member, (iii) applying said clutch until engine speed stabilizes at an engine idle speed, and (iv) sensing as a first value of said control parameter the value of said parameter when engine speed is stabilized at said idle speed; then (b) (i) applying said input shaft braking device to prevent rotation of said input shaft, (ii) causing said engine to develop a second torque different from said first torque at said output member, (iii) applying said clutch until engine speed stabilizes at said idle speed, and (iv) sensing as a second value of said control parameter the value of said control when engine speed is stabilized at said idle speed; and (c) using said first value of said control parameter and said first value of torque as a first point and said second value of said control parameter and said second value of torque as a second point, defining a linear relationship between said control parameter values and clutch torque capacity.

2. The method of claim 1 wherein said transmission is a mechanical transmission utilizing positive jaw clutches.

3. The method of claim 1 wherein said clutch is a liquid-cooled wet clutch.

4. The method of claim 1 wherein said clutch controller includes a solenoid-controlled valve and a source of pulse width-modulated electric power applied to the solenoid of said valve, said clutch control parameter comprising the pulse width modulation of said electric power.

5. The method of claim 1 wherein said first and second values are selected to provide a clutch torque capacity less than ten percent (10%) of the rated maximum capacity of said clutch.

6. The method of claim 5 wherein said first and second values are about 5 to 15 pound-feet and about 15 to 30 pound-feet, respectively.

7. The method of claim 1 wherein said system controller is microprocessor-based and said engine controller communicates with an electronic data link conforming to the protocols of one of SAE J1922, SAE J1939 or ISO 11898.

8. The method of claim 1 wherein said clutch is caused to be completely disengaged to cause said known torque transfer capacity to equal zero.

9. A method for determining the value of a clutch control parameter signal corresponding to an incipient engagement position of a vehicular master clutch in a vehicular drive line system including an electronically controlled internal combustion engine having an output member, a multiple-speed, change-gear transmission having an input shaft drivingly coupled to said output member by said master friction clutch, a clutch operator responding to said clutch control parameter signal to provide a selected torque transfer capacity from said output member to said input shaft, an engine controller for controlling fueling of said engine, said controller effective to fuel said engine to cause said engine to rotate at a selected engine speed and to develop a selected torque and to provide signals indicative of engine speed and developed torque, an input shaft braking device effective to retard rotation of said input shaft, a system controller for receiving input signals including signals indicative of (i) requested or sensed engine torque at said output member and (ii) engine speed, and for processing same according to logic rules to issue command output signals to system actuators including (i) said engine controller, (ii) said clutch operator and (iii) said input shaft braking device, said method characterized by:

(a) (i) applying said input shaft braking device to prevent rotation of said input shaft, (ii) applying the clutch by causing the value of said clutch control parameter to assume a first known value, (iii) commanding the engine to rotate at idle speed, and (iv) sensing as a first value of clutch torque capacity the torque at the engine output member when idle speed is stabilized; then (b) (i) applying said input shaft braking device to prevent rotation of said input shaft, (ii) applying the clutch by causing the value of said clutch control parameter to assume a second known value different from said first known value, (iii) commanding the engine to rotate at idle speed, and (iv) sensing as a second value of clutch torque capacity the torque at the engine output member when idle speed is stabilized; and (c) using said first value of said control parameter and said first value of torque as a first point and said second value of said control parameter and said second value of torque as a second point, defining a linear relationship between said control parameter values and clutch torque capacity.

10. The method of claim 9 wherein said transmission is a mechanical transmission utilizing positive jaw clutches.

11. The method of claim 9 wherein said clutch is a liquid-cooled wet clutch.

12. The method of claim 9 wherein said clutch controller includes a solenoid-controlled valve and a source of pulse width-modulated electric power applied to the solenoid of said valve, said clutch control parameter comprising the pulse width modulation of said electric power.

13. The method of claim 9 wherein said first and second values are selected to provide a clutch torque capacity less than ten percent (10%) of the rated maximum capacity of said clutch.

14. The method of claim 13 wherein said first and second values are about 5 to 15 pound-feet and about 15 to 30 pound-feet, respectively.

15. The method of claim 9 wherein said system controller is microprocessor-based and said engine controller communicates with an electronic data link conforming to the protocols of one of SAE J1922, SAE J1939 or ISO 11898.

* * * * *